United States Patent
Wu et al.

(10) Patent No.: US 8,648,555 B2
(45) Date of Patent: Feb. 11, 2014

(54) METHOD AND SYSTEM FOR CONTROLLING AN ELECTRIC MOTOR AT OR NEAR STALL CONDITIONS

(75) Inventors: Long Wu, Fargo, ND (US); Robert Shaw, Moorhead, MN (US)

(73) Assignee: Deere & Company, Moline, IL (US)

( * ) Notice: Subject to any disclaimer, the term of this patent is extended or adjusted under 35 U.S.C. 154(b) by 315 days.

(21) Appl. No.: 13/170,212

(22) Filed: Jun. 28, 2011

(65) Prior Publication Data

US 2012/0217908 A1     Aug. 30, 2012

Related U.S. Application Data

(60) Provisional application No. 61/447,323, filed on Feb. 28, 2011.

(51) Int. Cl.
    *H02P 21/00*             (2006.01)

(52) U.S. Cl.
    USPC ............... 318/400.02; 318/719; 318/567

(58) Field of Classification Search
    USPC ............ 318/400.02, 719, 567, 773, 783, 787, 318/488
    See application file for complete search history.

(56) References Cited

U.S. PATENT DOCUMENTS

| | | | |
|---|---|---|---|
| 4,023,083 A | 5/1977 | Plunkett | |
| 4,814,677 A | 3/1989 | Plunkett | |
| 5,486,748 A | 1/1996 | Konrad et al. | |
| 5,723,931 A | 3/1998 | Andrey | |
| 5,914,582 A | 6/1999 | Takamoto et al. | |
| 6,275,000 B1 | 8/2001 | Nishimura | |
| 7,045,988 B2 | 5/2006 | Ha et al. | |
| 7,157,878 B2 | 1/2007 | Collier-Hallman | |
| 7,586,286 B2 | 9/2009 | Cheng et al. | |
| 7,733,044 B2 | 6/2010 | Nakamura et al. | |
| 2004/0056629 A1* | 3/2004 | Maeda et al. | 318/719 |
| 2006/0247829 A1 | 11/2006 | Sato | |
| 2007/0210733 A1* | 9/2007 | Du et al. | 318/268 |
| 2011/0054749 A1 | 3/2011 | Merrion et al. | |
| 2011/0140643 A1 | 6/2011 | Wu | |
| 2012/0062161 A1 | 3/2012 | Patel et al. | |

OTHER PUBLICATIONS

International Search Report and Written Opinion of the International Searching Authority, dated Jun. 22, 2012 (11 pages).
US 7,595,604, 10/2009, Tomigashi (withdrawn).

* cited by examiner

*Primary Examiner* — Karen Masih

(57) ABSTRACT

A data processor determines whether a composite torque command is larger than a preset torque threshold for a time interval. The composite torque command is convertible into a direct-axis current command and a quadrature-axis current command. The data processor determines whether a rotor speed of the motor is less than a preset speed threshold for the time interval. The data processor, the current adjustment module, or the current shaping module adjusts the direct-axis current command and the quadrature-axis current command to obtain a revised direct-axis current command and revised quadrature-axis current command for the time interval if the composite torque command is larger than the preset torque threshold and if the rotor speed is less than the preset speed threshold, where the revised current commands vary by the detected rotational position of the rotor to achieve a generally constant shaft torque output.

20 Claims, 6 Drawing Sheets

METHOD AND SYSTEM FOR CONTROLLING AN ELECTRIC MOTOR AT OR NEAR STALL CONDITIONS

This document claims priority based on U.S. provisional application Ser. No. 61/447,323, filed on 28 Feb. 2011 and entitled METHOD AND SYSTEM FOR CONTROLLING AN ELECTRIC MOTOR AT OR NEAR STALL CONDITIONS, under 35 U.S.C. 119(e).

FIELD OF THE INVENTION

This invention relates to a method and system for controlling an electric motor at or near stall conditions.

BACKGROUND OF THE INVENTION

An electric motor may feature a rotor with permanent magnets and a stator, such as an interior permanent magnet (IPM) motor, an IPM synchronous motor, a surface mount permanent magnet motor, or another permanent magnet motor configuration. An electric motor may be used for vehicle propulsion, which often requires a wide speed range of motor control.

A stall condition means that a torque load is applied to an electric motor that causes the shaft speed of the motor to become or approach zero revolutions per minute. For example, a stall condition may be experienced if a vehicle propelled by an electric motor starts from a stationary position, if the vehicle is heavily loaded, if a vehicle is pulling a trailer or implement, or if the vehicle is heading up incline. At lower operational speeds that approach a stall condition, the electric motor may experience transient torque ripple, torque output oscillation or variable torque output. The passenger or operator of a vehicle may notice or complain about oscillatory, jittery or jerky movement of a vehicle with transient or variable torque output. Thus, there is a need for a method and system for controlling an electric motor at or near stall conditions to provide a uniform or stable torque output at lower operational speeds that approach a stall condition.

SUMMARY OF THE INVENTION

In accordance with one embodiment, a method and system is presented for controlling an electric motor at or near stall operational conditions. A sensor detects a rotational position of a rotor of the electric motor. A data processor determines whether a composite torque command is larger than a preset torque threshold for a time interval. The composite torque command is convertible into a direct-axis current command and a quadrature-axis current command. The data processor determines whether a motor speed of the rotor is less than a preset speed threshold for the time interval. The data processor, the current adjustment module, or the current shaping module adjusts the direct-axis current command and the quadrature-axis current command to obtain a revised direct-axis current command and revised quadrature-axis current command for the time interval if the composite torque command is larger than the preset torque threshold and if the rotor speed is less than the preset speed threshold, where the revised current commands (or the torque stall coefficient) vary by the detected rotational position of the rotor to achieve a generally constant shaft torque output.

DESCRIPTION OF THE PREFERRED EMBODIMENT

Figure 1:
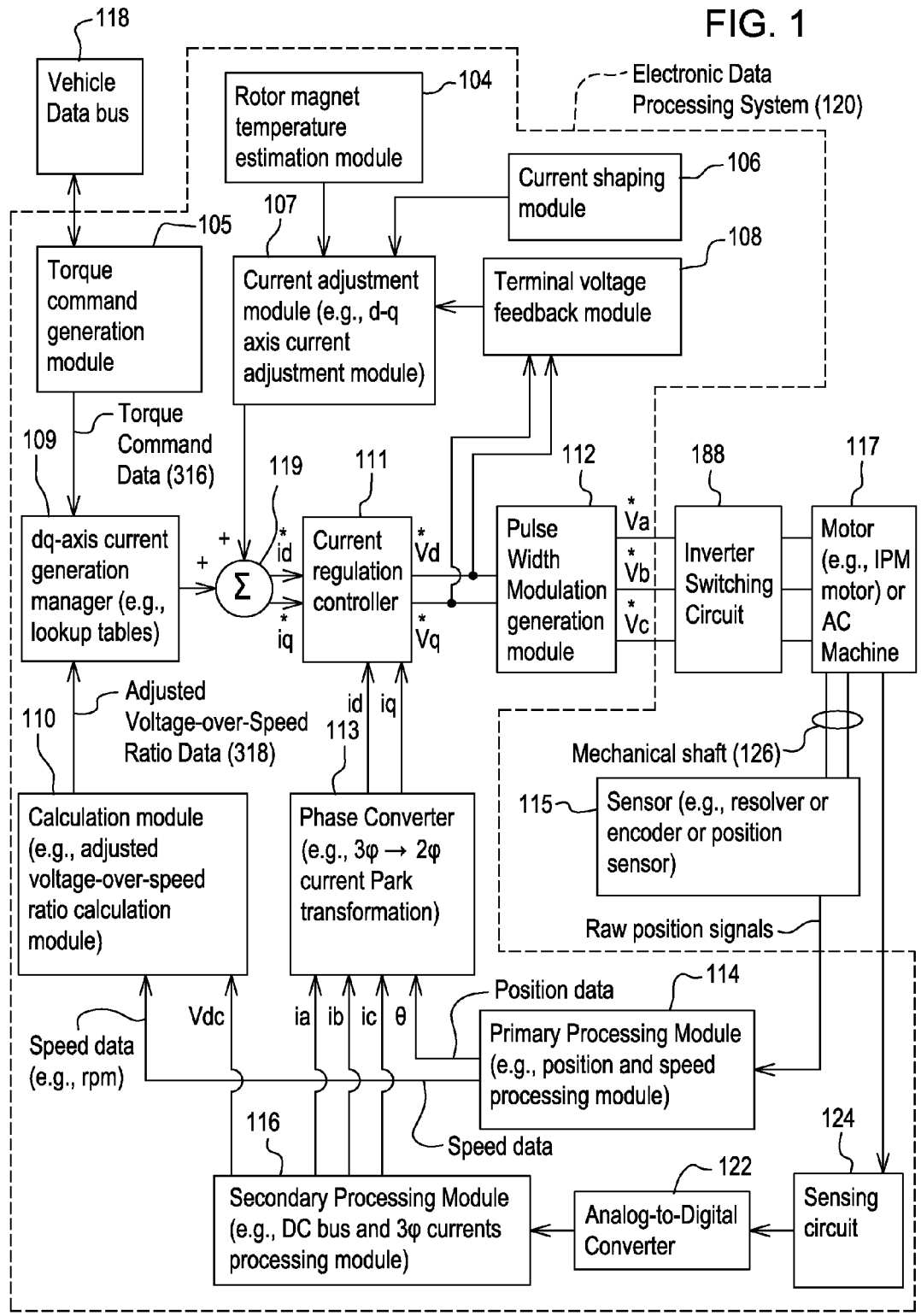
FIG. 1 is a block diagram of one embodiment of a system for controlling an electric motor at or near stall conditions.

In accordance with one embodiment, FIG. 1 discloses system for controlling a motor 117 (e.g., an interior permanent magnet (IPM) motor) or another alternating current machine. In one embodiment, the system, aside from the motor 117, may be referred to as an inverter or a motor controller.

The system comprises electronic modules, software modules, or both. In one embodiment, the motor controller comprises an electronic data processing system 120 to support storing, processing or execution of software instructions of one or more software modules. The electronic data processing system 120 is indicated by the dashed lines in FIG. 1 and is shown in greater detail in FIG. 2.

The data processing system 120 is coupled to an inverter circuit 188. The inverter circuit 188 comprises a semiconductor drive circuit that drives or controls switching semiconductors (e.g., insulated gate bipolar transistors (IGBT) or other power transistors) to output control signals for the motor 117. In turn, the inverter circuit 188 is coupled to the motor 117. The motor 117 is associated with a sensor 115 (e.g., a position sensor, a resolver or encoder position sensor) that is associated with the motor shaft 126 or the rotor. The sensor 115 and the motor 117 are coupled to the data processing system 120 to provide feedback data (e.g., current feedback data, such as $i_a$, $i_b$, $i_c$), raw position signals, among other possible feedback data or signals, for example. Other possible feedback data includes, but is not limited to, winding temperature readings, semiconductor temperature readings of the inverter circuit 188, three phase voltage data, or other thermal or performance information for the motor 117.

In one embodiment, the torque command generation module 105 is coupled to a d-q axis current generation manager 109 (e.g., d-q axis current generation look-up tables). D-q axis current refers to the direct axis current and the quadrature axis current as applicable in the context of vector-controlled alternating current machines, such as the motor 117. The output of the d-q axis current generation manager 109 and the output of a current adjustment module 107 (e.g., d-q axis current adjustment module 107) are fed to a summer 119. In turn, one or more outputs (e.g., direct axis current data ($i_d^*$) and quadrature axis current data ($i_q^*$)) of the summer 119 are provided or coupled to a current regulation controller 111.

The current regulation controller 111 is capable of communicating with the pulse-width modulation (PWM) generation module 112 (e.g., space vector PWM generation module). The current regulation controller 111 receives respective d-q axis current commands (e.g., $i_d^*$ and $i_q^*$) and actual d-q axis currents (e.g., $i_d$ and $i_q$) and outputs corresponding d-q axis voltage commands (e.g., $v_d^*$ and $v_q^*$ commands) for input to the PWM generation module 112.

In one embodiment, the PWM generation module 112 converts the direct axis voltage and quadrature axis voltage data from two phase data representations into three phase representations (e.g., three phase voltage representations, such as $v_a^*$, $v_b^*$ and $v_c^*$) for control of the motor 117, for example. Outputs of the PWM generation module 112 are coupled to the inverter 188.

The inverter circuit 188 comprises power electronics, such as switching semiconductors to generate, modify and control pulse-width modulated signals or other alternating current signals (e.g., pulse, square wave, sinusoidal, or other waveforms) applied to the motor 117. The PWM generation module 112 provides inputs to a driver stage within the inverter circuit 188. An output stage of the inverter circuit 188 provides a pulse-width modulated signal or other alternating current signal for control of the motor. In one embodiment, the inverter 188 is powered by a direct current (DC) voltage bus.

The motor 117 is associated with a sensor 115 (e.g., a resolver, encoder, speed sensor, or another position sensor or sensors) that estimates at least one of an angular position of the motor shaft 126, a speed or velocity of the motor shaft 126, and a direction of rotation of the motor shaft 126. The sensor 115 may be mounted on or integral with the motor shaft 126. The output of the sensor 115 is capable of communication with the primary processing module 114 (e.g., position and speed processing module). In one embodiment, the sensor 115 may be coupled to an analog-to-digital converter (not shown) that converts analog position data or velocity data to digital position or velocity data, respectively. In other embodiments, the sensor 115 (e.g., digital position encoder) may provide a digital data output of position data or velocity data for the motor shaft 126 or rotor.

A first output (e.g., position data and speed data for the motor 117) of the primary processing module 114 is communicated to the phase converter 113 (e.g., three-phase to two-phase current Park transformation module) that converts respective three-phase digital representations of measured current into corresponding two-phase digital representations of measured current. A second output (e.g., speed data) of the primary processing module 114 is communicated to the calculation module 110 (e.g., adjusted voltage over speed ratio module).

An input of a sensing circuit 124 is coupled to terminals of the motor 117 for sensing at least the measured three-phase currents and a voltage level of the direct current (DC) bus (e.g., high voltage DC bus which may provide DC power to the inverter circuit 188). An output of the sensing circuit 124 is coupled to an analog-to-digital converter 122 for digitizing the output of the sensing circuit 124. In turn, the digital output of the analog-to-digital converter 122 is coupled to the secondary processing module 116 (e.g., Direct current (DC) bus and three phase current processing module). For example, the sensing circuit 124 is associated with the motor 117 for measuring three phase currents (e.g., current applied to the windings of the motor 117, back EMF induced into the windings, or both).

Certain outputs of primary processing module 114 and the secondary processing module 116 feed the phase converter 113. For example, the phase converter 113 may apply a Park transformation or other conversion equations (e.g., certain conversion equations that are suitable are known to those of ordinary skill in the art) to convert the measured three-phase representations of current into two-phase representations of current based on the digital three-phase current data from the secondary processing module 116 and position data from the sensor 115. The output of the phase converter 113 module is coupled to the current regulation controller 111.

Other outputs of the primary processing module 114 and the secondary processing module 116 may be coupled to inputs of the calculation module 110 (e.g., adjusted voltage over-speed ratio calculation module). For example, the primary processing module 114 may provide speed data (e.g., motor shaft 126 revolutions per minute), whereas the secondary processing module 116 may provide a measured level of direct current voltage (e.g., on the direct current (DC) bus of a vehicle). The direct current voltage level on the DC bus that supplies the inverter circuit 188 with electrical energy may fluctuate or vary because of various factors, including, but not limited to, ambient temperature, battery condition, battery charge state, battery resistance or reactance, fuel cell state (if applicable), motor load conditions, respective motor torque and corresponding operational speed, and vehicle electrical loads (e.g., electrically driven air-conditioning compressor). The calculation module 110 is connected as an intermediary between the secondary processing module 116 and the dq-axis current generation manager 109. The output of the calculation module 110 can adjust or impact current commands generated by the d-q axis current generation manager 109 to compensate for fluctuation or variation in direct current bus voltage, among other things.

The rotor magnet temperature estimation module 104, the current shaping module 106, and the terminal voltage feedback module 108 are coupled to or are capable of communicating with the dq-axis current adjustment module 107. In turn, the d-q axis current module 107 may communicate with the dq-axis current generation manager or the summer 119.

The rotor magnet temperature module 104 estimates or determines the temperature of the rotor permanent magnet or magnets. In one embodiment, the rotor magnet temperature estimation module 104 may estimate the temperature of the rotor magnets from internal control variables calculation, one or more sensors located on the stator, in thermal communication with the stator, or secured to the housing of the motor 117.

In one alternate embodiment, the rotor magnet temperature estimation module 104 may be replaced by or may estimate the temperature of the rotor magnets from one or more sensors located on the stator, in thermal communication with the stator, or secured to the housing of the motor 117.

In another alternative embodiment, the rotor magnet temperature estimation module 104 may be replaced with a temperature detector (e.g., a thermistor or infrared thermal detector coupled to a wireless transmitter) mounted on the rotor or the magnet, where the detector provides a signal (e.g., wireless signal) indicative of the temperature of the magnet or magnets.

In one embodiment, the method or system may operate in the following manner. The torque command generation module 105 receives an input control data message, such as a speed control data message, a voltage control data message, or a torque control data message, over a vehicle data bus 118. The torque command generation module 105 converts the received input control message into torque control command data 316.

The d-q axis current generation manager 109 selects or determines the direct axis current command data and the quadrature axis current command data associated with respective torque control command data and respective detected motor shaft 126 speed data. For example, the d-q axis current generation manager 109 selects or determines the direct axis current command, the quadrature axis current command by accessing one or more of the following: (1) a look-up table, database or other data structure that relates respective torque commands to corresponding direct and quadrature axes currents, (2) a set of quadratic equations or linear equations that relate respective torque commands to corresponding direct and quadrature axes currents, or (3) a set of rules (e.g., if-then rules) that relates respective torque commands to corresponding direct and quadrature axes currents. The sensor 115 on the motor 117 facilitates provision of the detected speed data for the motor shaft 126, where the primary processing module 114 may convert position data provided by the sensor 115 into speed data.

The current adjustment module 107 (e.g., d-q axis current adjustment module) provides current adjustment data to adjust the direct axis current command data and the quadrature axis current command data based on input data from the rotor magnet temperature estimation module 104 and the current shaping module 106.

The current shaping module 106 may determine a correction or preliminary adjustment of the quadrature axis (q-axis) current command and the direct axis (d-axis) current command based on one or more of the following factors: torque load on the motor 117 and speed of the motor 117, for example. The rotor magnet temperature estimation module 104 may generate a secondary adjustment of the q-axis current command and the d-axis current command based on an estimated change in rotor temperature, for example. The terminal voltage feedback module 108 may provide a third adjustment to d-axis and q-axis current based on controller voltage command versus voltage limit. The current adjustment module 107 may provide an aggregate current adjustment that considers one or more of the following adjustments: a preliminary adjustment, a secondary adjustment, and a third adjustment.

The sensor 115 (e.g., shaft or rotor speed detector) may comprise one or more of the following: a direct current motor, an optical encoder, a magnetic field sensor (e.g., Hall Effect sensor), magneto-resistive sensor, and a resolver (e.g., a brushless resolver). In one configuration, the sensor 115 comprises a position sensor, where position data and associated time data are processed to determine speed or velocity data for the motor shaft 126. In another configuration, the sensor 115 comprises a speed sensor, or the combination of a speed sensor and an integrator to determine the position of the motor shaft.

In yet another configuration, the sensor 115 comprises an auxiliary, compact direct current generator that is coupled mechanically to the motor shaft 126 of the motor 117 to determine speed of the motor shaft 126, where the direct current generator produces an output voltage proportional to the rotational speed of the motor shaft 126. In still another configuration, the sensor 115 comprises an optical encoder with an optical source that transmits a signal toward a rotating object coupled to the shaft 126 and receives a reflected or diffracted signal at an optical detector, where the frequency of received signal pulses (e.g., square waves) may be proportional to a speed of the motor shaft 126. In an additional configuration, the sensor 115 comprises a resolver with a first winding and a second winding, where the first winding is fed with an alternating current, where the voltage induced in the second winding varies with the frequency of rotation of the rotor.

Figure 2:
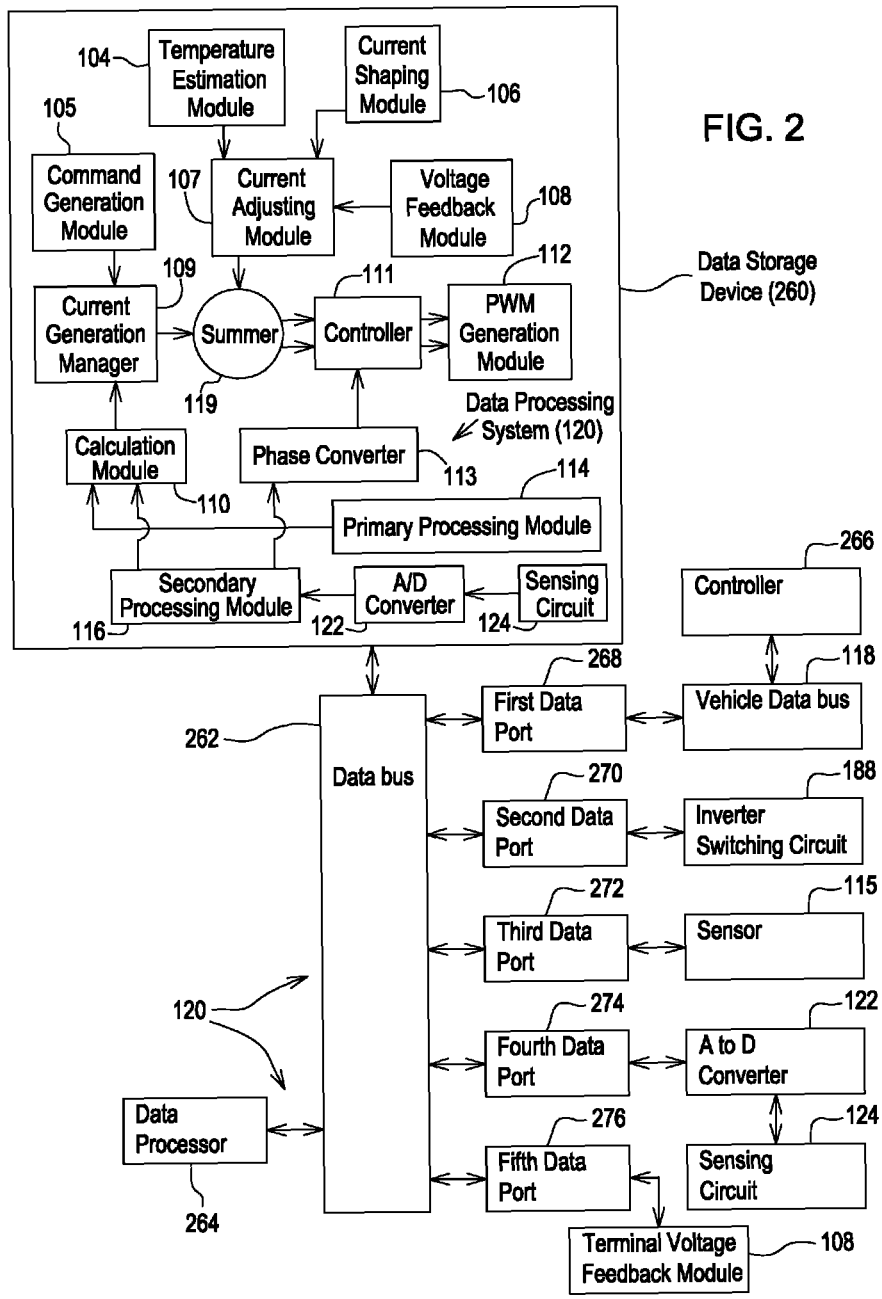
FIG. 2 is a block diagram of an electronic data processing system of FIG. 1.

In FIG. 2, the electronic data processing system 120 comprises an electronic data processor 264, a data bus 262, a data storage device 260, and one or more data ports (268, 270, 272, 274 and 276). The data processor 264, the data storage device 260 and one or more data ports are coupled to the data bus 262 to support communications of data between or among the data processor 264, the data storage device 260 and one or more data ports.

In one embodiment, the data processor 264 may comprise one or more of the following electronic components: an electronic data processor, a microprocessor, a microcontroller, a programmable logic array, a field programmable gate array (FPGA), a logic circuit, an arithmetic logic unit, an application specific integrated circuit, a digital signal processor (DSP), a proportional-integral-derivative (PID) controller, or another data processing device. The above electronic components may be interconnected via one or more data buses, parallel data buses, serial data buses, or any combination of parallel and serial data buses, for example.

The data storage device 260 may comprise any magnetic, electronic, or optical device for storing data. For example, the data storage device 260 may comprise an electronic data storage device, an electronic memory, non-volatile electronic random access memory, one or more electronic data registers, data latches, a magnetic disc drive, a hard disc drive, an optical disc drive, or the like.

As shown in FIG. 2, the data ports comprise a first data port 268, a second data port 270, a third data port 272, a fourth data port 274 and a fifth data port 276, although any suitable number of data ports may be used. Each data port may comprise a transceiver and buffer memory, for example. In one embodiment, each data port may comprise any serial or parallel input/output port.

In one embodiment as illustrated in FIG. 2, the first data port 268 is coupled to the vehicle data bus 118. In turn, the vehicle data bus 118 is coupled to the controller 266. In one configuration, the second data port 270 may be coupled to the inverter circuit 188; the third data port 272 may be coupled to the sensor 115; the fourth data port 274 may be coupled to the analog-to-digital converter 122; and the fifth data port 276 may be coupled to the terminal voltage feedback module 108. The analog-to-digital converter 122 is coupled to the sensing circuit 124.

In one embodiment of the data processing system 120, the torque command generation module 105 is associated with or supported by the first data port 268 of the electronic data processing system 120. The first data port 268 may be coupled to a vehicle data bus 118, such as a controller area network (CAN) data bus. The vehicle data bus 118 may provide data bus messages with torque commands to the torque command generation module 105 via the first data port 268. The operator of a vehicle may generate the torque commands via a user interface, such as a throttle, a pedal, a controller 266, or other control device.

In certain embodiments, the sensor 115 and the primary processing module 114 may be associated with or supported by a third data port 272 of the data processing system 120.

Figure 3:
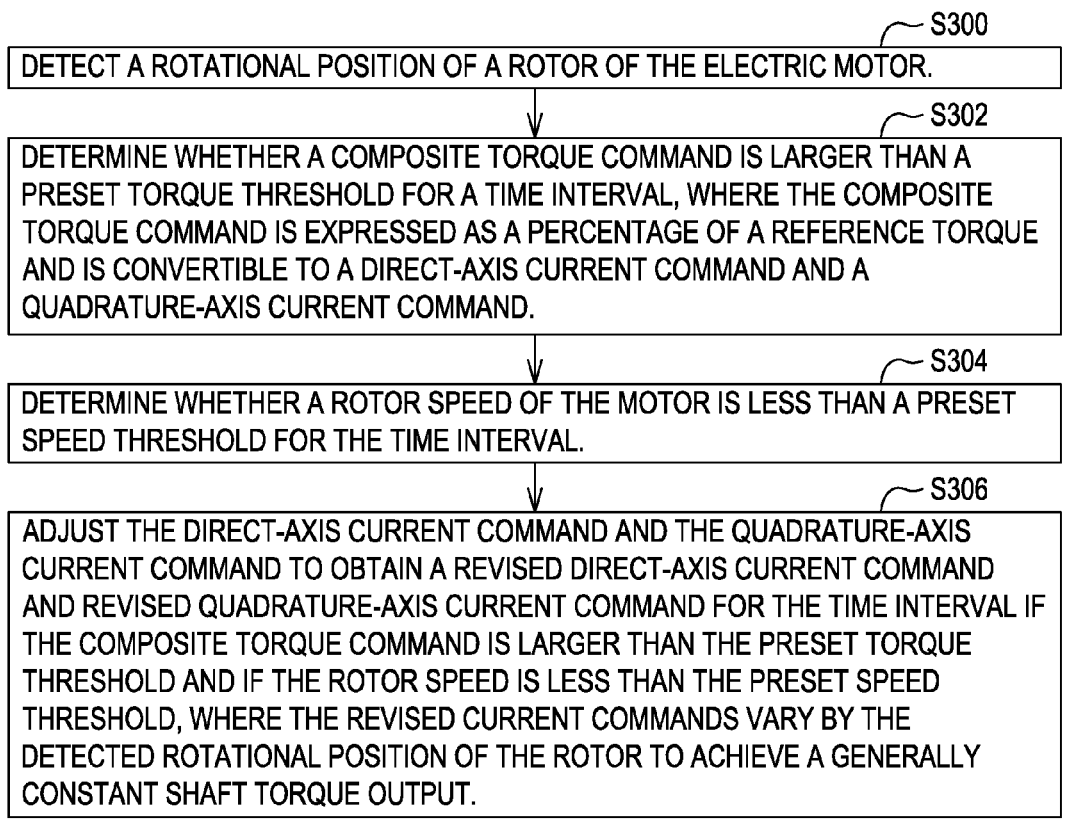
FIG. 3 is a flow chart of a first example of a method for controlling an electric motor at or near stall conditions.

FIG. 3 discloses a first illustrative example of a method for controlling a motor (e.g., 117) at or near stall conditions. A stall condition means that a torque load is applied to an electric motor (e.g., 117) that causes the shaft speed of the motor (e.g., 117) to become or approach zero revolutions per minute. As the electric motor (e.g., 117) operates at very low speeds (e.g., below approximately 100 revolutions per minute) that approach stall conditions the electric motor (e.g., 117) may provide an undesired oscillating torque output or an undesired torque output with ripple, without the control method set forth in FIG. 3. For example, the oscillating torque output may be described as a somewhat sinusoidal variation of the magnitude of output torque over a time period.

The method of FIG. 3 begins in step S300 to reduce or eliminate oscillating torque output or an undesired torque output with ripple near or at stall conditions.

In step S300, a sensor 115 detects a rotational position of a rotor of the electric motor (e.g., 117). For example, the sensor 115 may provide raw position signals on the rotational position of the rotor to a primary processing module 114, where the primary processing module 114 refines the detected rotational position or determines a motor (e.g., 117) speed of the rotor based on the detected rotational position versus time. The rotational position may be expressed as an angle of the rotor with respect to the stator, where the angle ranges from zero to 360 degrees, or where the angle is expressed in radians. The primary processing module 114 may comprise a clock or clock signal for determining the time between detected rotational positions for purposes of determining a motor (e.g., 117) speed of the rotor.

In step S302, a data processor 264, a current adjustment module 107, or a current regulation controller 111 determines whether a composite torque command is larger than a preset torque threshold for a time interval (e.g., one or more pulse-width modulation cycles of the inverter switching circuit 188), where the composite torque is convertible into a direct-axis current command and a quadrature-axis current command. In one embodiment, the composite torque command may be expressed as a percentage, fraction, or portion of a reference torque of the motor 117. The data processor 264 may convert the composite torque command into a direct-axis current command and a quadrature-axis current command. The reference torque of the motor may be defined in accordance with one or more of the following: (1) the reference torque is equal to or approximates a maximum torque of the motor; (2) the reference torque is equal to or approximates a stall torque of the motor reduced by a tolerance margin, where the stall torque is the torque of the motor when the motor has stalled (e.g., zero revolutions per minute of shaft speed or rotor speed); or (3) the reference torque is equal to or approximates a target torque of the motor at some corresponding reference rotor speed or within a speed range of the rotor speed (e.g., lower speed or lower speed range that does not produce wheel spin for a vehicle under specified operation conditions, tire parameters, or ground parameters); (4) the reference torque is equal to or less than a torque on an operational torque versus speed output curve (e.g., motor characteristic torque curve) for the motor, based on the sensed rotor speed for the motor; (5) the reference torque is consistent with a maximum torque per ampere (MTPA) current trajectory associated with a low speed range of the motor 117; and (6) the reference torque is consistent with a maximum torque or peak torque for a particular corresponding application of the motor or based on the motor specifications or design.

In one embodiment, the composite torque command may be used to determine an absolute torque command that is based on the composite torque in percentage multiplied by the reference torque of the motor, where the absolute torque is a number expressed in newton-meters, foot-pounds, inch ounce force, or other similar units.

Step S302 may be carried out in accordance with various procedures that may be applied alternately or cumulatively. Under a first procedure, the composite torque command comprises a torque command (e.g., stall torque command) expressed as a percentage of the reference torque, where the preset threshold is determined based on motor specifications, empirical tests, field tests, or a torque versus speed characteristic curve determined for the motor during a motor test and characterization process.

Under a second procedure, the preset torque threshold is typically around eighty percent (80%) to eighty-five percent (85%) of the reference torque. As used in this document, "around" shall mean plus or minus ten percent of the reference torque or any other number that it modifies. The actual percentage of the preset threshold torque may depend upon the application of the motor (e.g., vehicle size, vehicle weight, among other things) and the motor design of the motor, for example. For an internal permanent magnet motor (e.g., 117), the machine characterization at low speed generates a maximum torque per ampere (MTPA) current trajectory. Along the MTPA current trajectory, the quadrature-axis current command (Iq*) is varying versus the direct-axis current command (Id*) as the composite or total torque command increases. When the composite or total torque command exceeds the preset threshold (e.g., 80%), the ratio between the quadrature-axis current command and the direct axis current command is generally fixed (e.g., for optimum performance).

Under a third procedure, the preset torque threshold is around eighty to eighty-five percent of peak torque of the motor (e.g., 117).

Under a fourth procedure, the preset torque threshold is approximately eighty percent of a maximum stall torque, or around eighty percent of a torque that is produced when the motor shaft has a rotational speed equal to zero or approaching zero.

In step S304, a sensor 115, the primary processing module 114 or the data processor 264 determines whether a rotor speed of the motor is less than a preset speed threshold for the time interval (e.g., one or more pulse width modulation cycles). Under a first example, the preset speed threshold is around 50 revolutions per minute (rpm) to around 100 revolutions per minute (rpm). Under a second example, the preset speed threshold is less than or equal to approximately one-hundred revolutions per minute. As used in this document, "approximately" shall mean plus or minus five percent of the revolutions per minute, torque or any other number that it modifies.

In step S306, the data processor 264, the current adjustment module 107, or the current regulation controller 111 adjusts the direct-axis current command and the quadrature-axis current command to obtain a revised direct-axis current command and revised quadrature-axis current command for the time interval if the composite torque command is larger than the preset torque threshold and if the rotor speed is less than the preset speed threshold, where the revised current commands vary by the detected rotational position of the rotor to achieve a generally constant shaft torque output.

In accordance with one technique for carrying out step S306, the data processor 264 or d-q axis current generation manager 109 retrieves the d-q axis commands from one or more multi-dimensional tables or other multi-dimensional data structure in the data storage device 260. The direct-axis current command may be retrieved from a three dimensional table (e.g., first three dimensional table), database, file, or data record (in the data storage device 260) that contains relationships between torque command data 316, speed data (e.g., adjusted voltage-over-speed ratio data 318), and a direct-axis current command. For example, a first three dimensional table may store various combinations or permutations of associated torque command data 316, speed data, and direct-axis current commands. In one embodiment, the quadrature-axis current command may be retrieved from a three dimensional table (e.g., second three dimensional table), database, file, or data record (in the data storage device 260) that contains relationships between torque command data 316, speed data (e.g., adjusted voltage-over-speed ratio data), and a quadrature-axis current command. For example, the second three dimensional table may store various combinations or permutations of associated torque command data, speed data, and quadrature-axis current commands. In one illustrative example, the revised direct-axis current command and revised quadrature-axis current command may be obtained by multiplying (e.g., dynamically or in real time) the direct-axis command and the quadrature-axis command by one more stall torque coefficients, for example. Step S306 may be executed in accordance with various techniques that may be applied alternately or cumulatively. Under a first technique, the data processor 264, current adjustment module 107, the d-q axis current generation manager 109, or the current regulation controller 111 determines or applies (or is adapted to determine or adapted to apply) the revised current commands to the motor (e.g., 117) to minimize or reduce torque oscillation, where the motor (e.g., 117) comprises a permanent magnet motor (e.g., 117) with stator slots in a stator and permanent magnets associated with the rotor. Here, "adapted to determine" or "adapted to apply" means the data processor 264 is configured to execute software instructions stored on the data storage device 260, where the software instructions may be configured as a current adjustment module 107, the d-q axis current generation manager 109, or a current regulation controller 111, for example.

Under a second technique, the data processor 264, the d-q axis current generation manager, 109, the current adjustment module 107, or current regulation controller 111 determines or selects (or is adapted to determine or adapted to select) the revised current commands such that a constant shaft torque output can be obtained at every rotor position across each slot span (or stator slot span), where in the absence of the revised current commands a maximum peak stall torque would occur approximately at a radial midpoint of each slot span of a stator of the motor (e.g., 117) and a minimum peak stall torque would occur approximately at a radial midpoint of each slot opening (or slot span) of a stator of the motor. A slot span means the stator slot opening and an intervening stator portion (e.g., approximately one-half of the intervening stator portion) that adjoins each side of the stator slot opening. In one embodiment, the slot span means the stator slot opening and approximately one-half of the intervening stator portion that adjoins each side of the stator slot opening, where a radial angle (e.g., with a vertex extending from the shaft outward) intercepts and divides each intervening stator portion into two equal halves or radial segments. Here, "adapted to determine" or "adapted to apply" means the data processor 264 is configured to execute software instructions stored on the data storage device, where the software instructions may be configured as a current adjustment module 107 or a current regulation controller 111, for example.

Under a third technique, the data processor 264, the d-q axis current generation manager 109, the current adjustment module 107, or current regulation controller 111 determines or selects (or is adapted to determine or adapted to select) the revised current commands such that a constant shaft torque output can be obtained throughout the whole rotor periphery and the output torque is generally uniform across each slot span. Here, adapted to determine or adapted to select means the data processor 264 is configured to execute software instructions stored on the data storage device, where the software instructions may be configured as a current adjustment module 107 or a current regulation controller 111, for example.

Under a fourth technique, the data processor 264, current adjustment module 107, or current regulation controller 111 determines (or is "adapted to determine") revised quadrature-axis current command and the revised direct-axis current command are determined by multiplying a stall torque coefficient by the direct-axis current command and the quadrature-axis current command. The stall torque coefficient and corresponding rotor position may be stored in a multi-dimensional data structure or a multi-dimensional lookup table (e.g., a two dimensional lookup table), a database, a file, a lookup table or other data format stored in a data storage device 260. The look-up table with pairs of stall torque coefficients and corresponding rotor positions may be referred to as third look-up table. Here, adapted to determine means the data processor 264 is configured to execute software instructions stored on the data storage device 260, where the software instructions may be configured as a current adjustment module 107, the d-q axis current generation manager 109, or a current regulation controller 111, for example.

Figure 4:
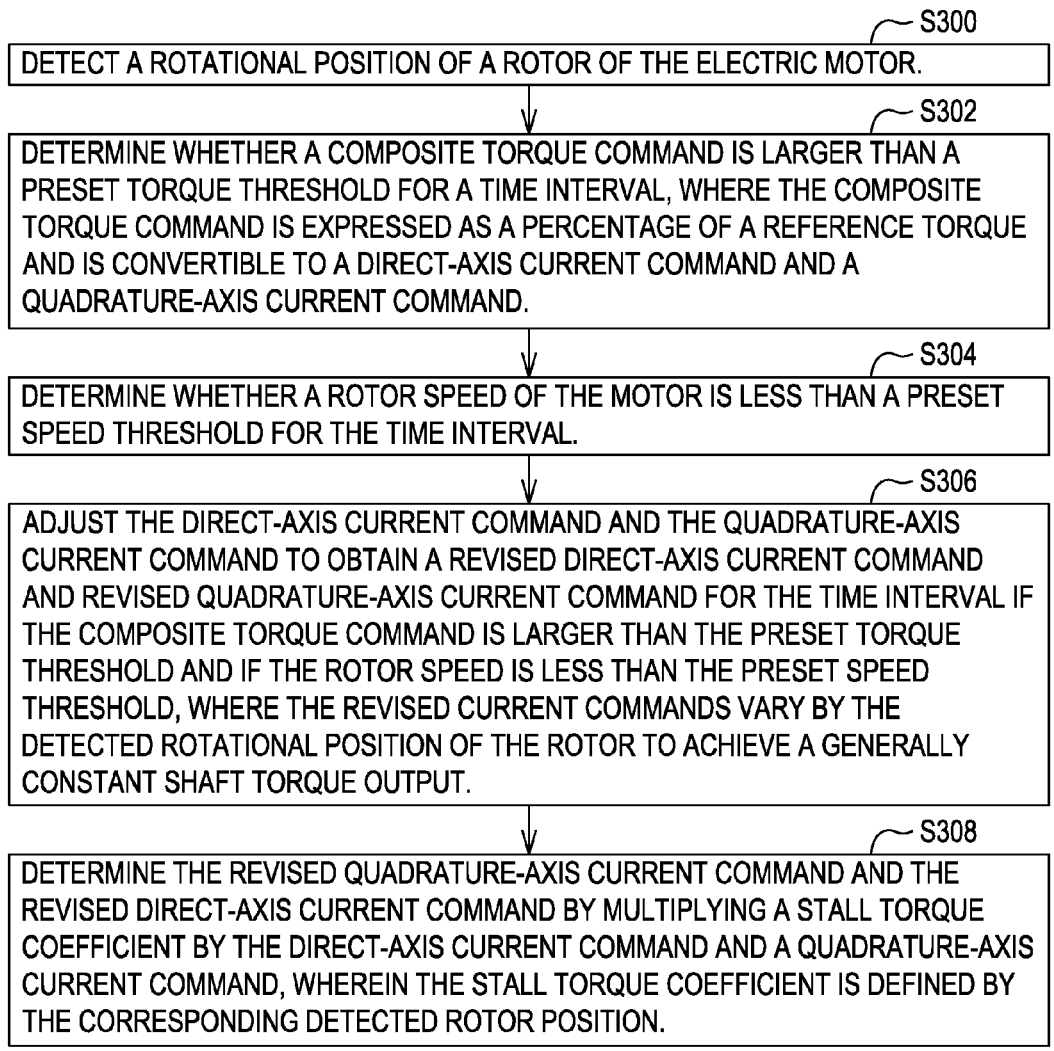
FIG. 4 is a flow chart of a second example of a method for controlling an electric motor at or near stall conditions.

The method of FIG. 4 is similar to the method of FIG. 3, except the method of FIG. 4 further includes step S308. Like reference numbers indicate like steps or procedures in FIG. 3 and FIG. 4.

In step S308, the data processor 264, the current adjustment module 107, the d-q axis current generation manager 109, or the current regulation controller 111 determines the revised quadrature-axis current command and the revised direct-axis current command by multiplying a stall torque coefficient by the direct-axis current command and a quadrature-axis current command, wherein the stall torque coefficient is defined by a corresponding detected rotor position.

As previously indicated, the direct-axis current command and the quadrature-axis current command are first determined and then the revised direct axis-current command and the quadrature-axis current command are determined. In one embodiment, the direct-axis current command may be retrieved from a multi-dimensional data structure or a multi-dimensional table (e.g., first three dimensional table), database, file, or data record that contains relationships between torque command data 316, speed data (e.g., adjusted voltage-over-speed ratio data 318), and a direct-axis current command. For example, a first three dimensional table may store various combinations or permutations of associated torque command data 316, speed data, and direct-axis current commands. In one embodiment, the quadrature-axis current command may be retrieved from a multi-dimensional data structure or a three dimensional table (e.g., second three dimensional table), database, file, or data record that contains relationships between torque command data 316, speed data (e.g., adjusted voltage-over-speed ratio data 318), and a quadrature-axis current command. For example, the second three dimensional table may store various combinations or permutations of associated torque command data 316, speed data, and quadrature-axis current commands.

In one illustrative example, the revised direct-axis current command and revised quadrature-axis current command may be obtained by multiplying (e.g., dynamically or in real time) the direct-axis command and the quadrature-axis command by one more stall torque coefficients, for example. For example, the stall torque coefficient may vary based on the corresponding detected rotor position of the rotor of the motor.

For an internal permanent magnet motor (e.g., 117), the machine characterization at low speed generates a maximum torque per ampere (MTPA) current trajectory. Along the MTPA current trajectory, the quadrature-axis current command (Iq*) is varying versus the direct-axis current command (Id*) as the composite or total torque command increases. When the composite or total torque command exceeds the preset threshold (e.g., 80%), the ratio between the quadrature-axis current command and the direct axis current command is generally fixed. If the current shaping module 106 or data processor 264 multiplies the original direct-axis current command and the original quadrature-axis current command by the current shaping coefficient or a stall torque coefficient, it is still along or consistent with the best efficiency MTPA current trajectory.

Figure 5:
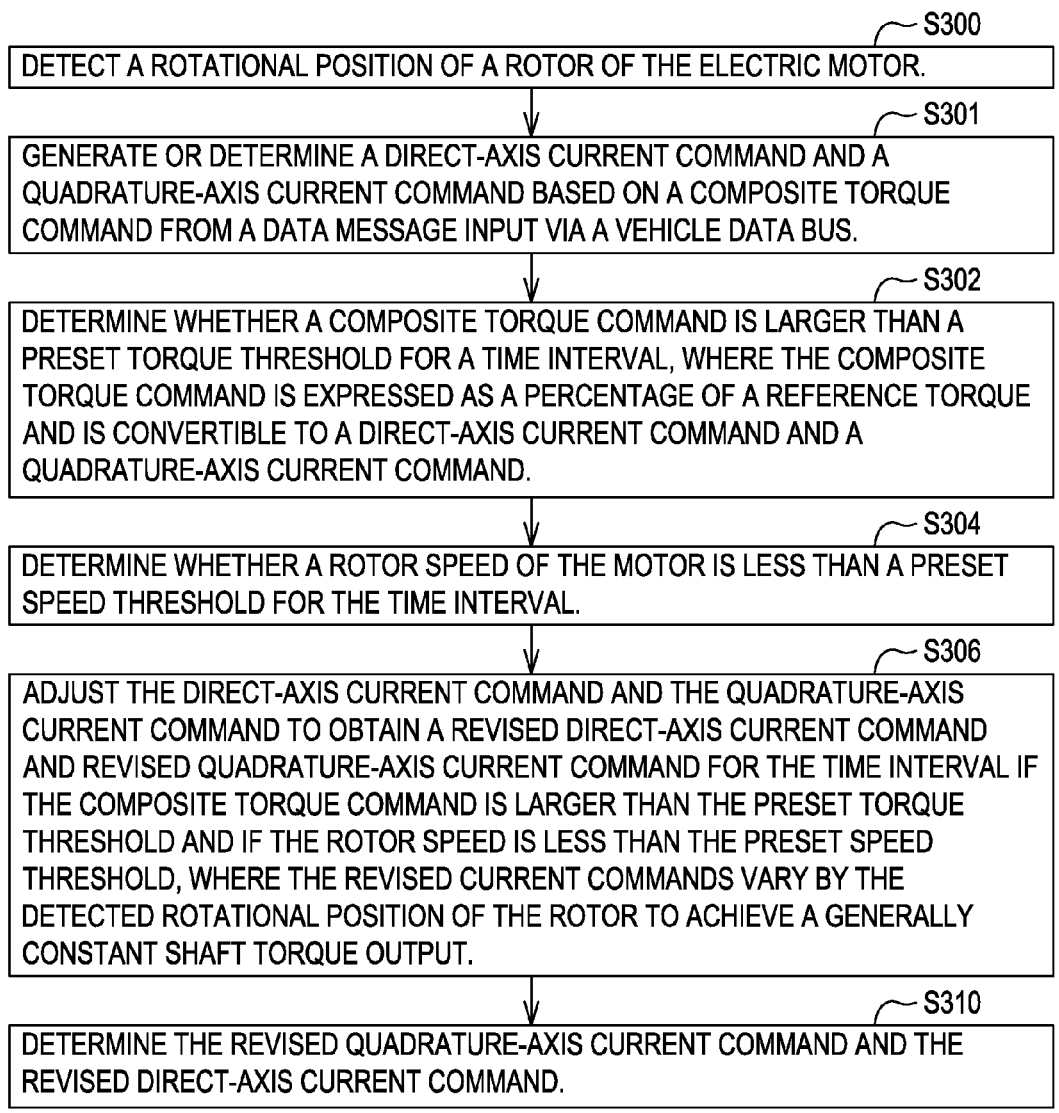
FIG. 5 is a flow chart of a third example of a method for controlling an electric motor at or near stall conditions.

The method of FIG. 5 is similar to the method of FIG. 3, except the method of FIG. 5 further includes step S301 and S310. Like reference numbers indicate like steps or procedures in FIG. 3 and FIG. 5.

In step S300, a sensor 115 detects a rotational position of a rotor of the electric motor (e.g., 117). For example, the sensor 115 may provide raw position signals on the rotational position of the rotor to a primary processing module 114, where the primary processing module 114 refines the detected rotational position or determines a rotor speed of the motor based on the detected rotational position versus time. The primary processing module 114 may comprise a clock or clock signal for determining the time between detected rotational positions for purposes of determining a motor (e.g., 117) speed of the rotor.

In step S301, a data processor 264 or d-q axis current generation manager 109 generates or determines a direct axis current command and a corresponding quadrature axis current command consistent with or based on the composite torque command from a data message input via a vehicle data bus. For example, the data processor 264 or the d-q axis current generation manager 109 converts the composite torque command into a direct axis current command and a corresponding quadrature axis current command. In one embodiment, the direct-axis current command is determined by accessing a first multi-dimensional data structure, such as a first look-up table, a database, a file, a data record, or other data structure stored in a data storage device 260 based on a data message input via a vehicle data bus. Similarly, the quadrature-axis current command is determined by accessing a second multi-dimensional data structure, such as a second look-up table, a database, a file, a data record, or other data structure stored in a data storage device 260 based on a data message input via a vehicle data bus. The first multi-dimensional data structure, the second multi-dimensional data structure, or both may be obtained from a motor characterization procedure, from empirical studies, motor (e.g., 117) testing, or motor (e.g., 117) specifications, for instance.

In step S302, a data processor 264, a current adjustment module 107, or a current regulation controller 111 determines whether a composite torque command is larger than a preset torque threshold for a time interval. The composite torque command may be expressed a percentage, a fraction or a portion of a reference torque, for example. In one embodiment, the composite torque command comprises a stall torque command expressed as a percentage. Further details on step S302 were previously presented in conjunction with FIG. 3 and apply equally here to FIG. 5.

In step S304, a sensor 115, the primary processing module 114 or the data processor 264 determines whether a rotor speed of the rotor is less than a preset speed threshold for the time interval. Under a first example, the preset speed threshold is around 50 revolutions per minute (rpm) to around 100 revolutions per minute (rpm). Under a second example, he preset speed threshold is less than or equal to approximately one-hundred revolutions per minute. Further details on step S304 were previously presented in conjunction with FIG. 3 and apply equally here to FIG. 5.

In step S306, the data processor 264, the current adjustment module 107, or the current regulation controller 111 adjusts the direct-axis current command and the quadrature-axis current command to obtain a revised direct-axis current command and revised quadrature-axis current command for the time interval if the composite torque command is larger than the preset torque threshold and if the rotor speed is less than the preset speed threshold, where the revised current commands vary by the detected rotational position of the rotor to achieve a generally constant shaft torque output. Further details on step S306 were previously presented in conjunction with FIG. 3 and apply equally here to FIG. 5.

In step S310, the data processor 264, current adjustment module 107 or current regulation controller 111 determines the revised quadrature-axis current command and the revised direct-axis current command by accessing a second look-up table stored in the data storage device.

In one embodiment for executing step S310, the data processor 264, the current adjustment module 107, or the current regulation controller 111 accesses a third multi-dimensional data structure (e.g., a third look-up table) to determine a stall torque coefficient based on stored relationships between varying stall torque coefficients versus corresponding detected rotor positions. The stall torque coefficient provides the basis for determination of the revised quadrature-axis current command and the revised direct-axis current command. For example, the data processor 264, the current adjustment module 107, or current regulation controller 111 determines revised quadrature-axis current command and the revised direct-axis current command by multiplying a stall torque coefficient by the direct-axis current command and the quadrature-axis current command stored in a third look-up table in a data storage device.

Figure 6:
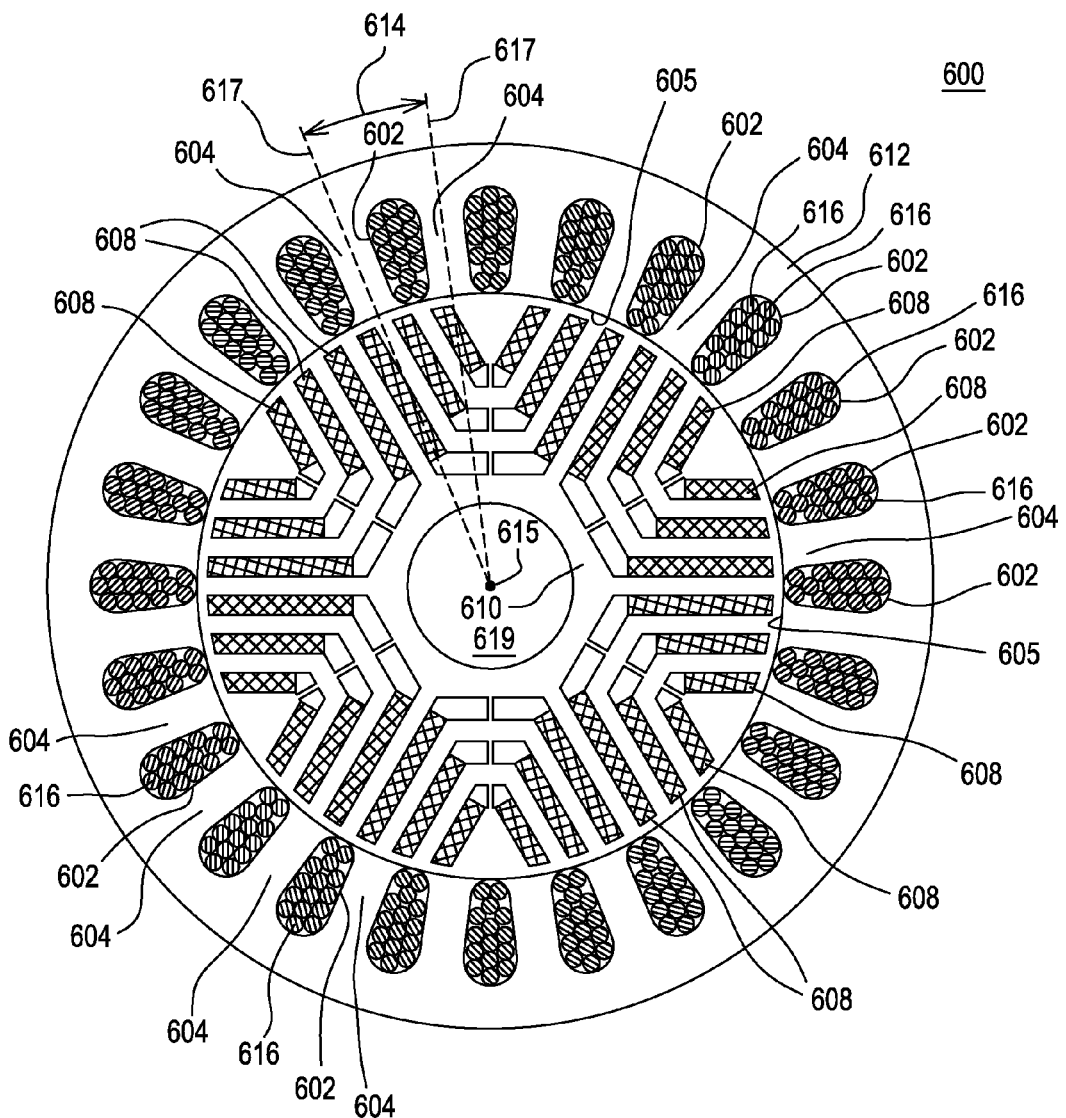
FIG. 6 is a cross section of an illustrative embodiment of a motor (e.g. an interior permanent magnet motor).

FIG. 6 shows an illustrative cross section of a motor 117 that may be used with the method and system described in this document. In the example of FIG. 6, the motor 600 is illustrated as an interior permanent magnet machine, although other configurations of motors or machines may be used and fall within the scope of the invention. The motor 600 may be used instead of motor 117 in FIG. 1 or FIG. 2, for example.

The motor 600 comprises a stator 612 that encompasses or at least partially surrounds a radial periphery of the rotor 610. The rotor 610 is rotatable with respect to the stator 612.

In the motor 600 of FIG. 6, the stator 612 comprises stator slot openings 602 that are radially spaced apart (e.g., uniformly) in the stator core 612. The stator slot openings 602 are separated by intervening stator portions 604 or islands in the stator core 612. In one embodiment, each of the intervening stator portions 604 may have a curved interior surface 605 that, in the aggregate, forms a generally cylindrical surface that is interrupted by the slot openings 602 at generally uniform radial spacings.

As best illustrated by the dashed lines 617 extending from the axis 615 of the motor shaft 619, the stator slot span (e.g., 614) may comprise a stator slot opening 602 and approximately one-half of the intervening stator portions 604 on each side of the stator slot opening 602. For example, the stator slot span may be defined as extending over a radial angle 614 that intercepts the midpoint of the intervening stator portions 604, where a vertex of the radial angle 614 is coextensive with an axis 615 of motor shaft 619 of the motor 600. Stator windings 616 reside in one or more of the stator slot openings 602.

In the motor 117, the rotor has rotor slots or rotor openings for receiving permanent magnets 608 (e.g., generally rectangular magnets or magnets with other geometric configurations) that are buried or embedded in the rotor 610. The poles of the magnets in the rotor 610 and the poles of the stator windings 616 are aligned to form a desired configuration and number of pole pairs.

The system and method disclosed herein is well-suited for controlling an electric motor at or near stall conditions to provide a uniform or stable torque output at lower operational speeds that approach a stall condition. The system and method disclosed herein facilitates elimination or reduction of transient torque ripple, torque output oscillation or variable torque output at lower operational speeds of the motor that are at or near stall conditions. Accordingly, the system and method supports improved performance of electrically propelled motor vehicles such that passenger or operator of the vehicle avoids oscillatory, jittery or jerky movement of a vehicle with transient or variable torque output that would otherwise occur. This method applies to interior permanent magnet machines, surface mounted PM machines, and other machines or motors with permanent magnets.

Having described the preferred embodiment, it will become apparent that various modifications can be made without departing from the scope of the invention as defined in the accompanying claims.

The invention claimed is:

1. A method for controlling an electric motor at or near stall operational conditions, the method comprising:
   detecting a rotational position of a rotor of the electric motor;
   determining whether a composite torque command is larger than a preset torque threshold for a time interval, the composite torque command convertible into a direct-axis current command and a quadrature-axis current command;
   determining whether a sensed motor speed of the rotor is less than a preset speed threshold for the time interval at any lower speed of the rotor that approaches stall operational conditions; and
   adjusting the direct-axis current command and the quadrature-axis current command to obtain a revised direct-axis current command and revised quadrature-axis current command for the time interval if the composite torque command is larger than the preset torque threshold and if the motor speed is less than the preset speed threshold, where the revised current commands vary by the detected rotational position of the rotor to achieve a generally constant shaft torque output.

2. The method according to claim 1 further comprising:
   generating the dq-axis current commands from one or more multi-dimensional data structures or look-up tables based on the composite torque command.

3. The method according to claim 1 further comprising:
   applying the revised current commands to the motor to minimize or reduce torque oscillation, where the motor comprises a permanent magnet motor with stator slots in a stator and permanent magnets associated with the rotor.

4. The method according to claim 3 wherein the revised current commands are selected such that a constant shaft torque output can be obtained at every rotor position across each slot span, where in the absence of the revised current commands a maximum peak stall torque would occur approximately at a radial midpoint of each slot of a stator of the motor and a minimum peak stall torque would occur approximately at a radial midpoint of each slot opening of a stator of the motor.

5. The method according to claim 3 wherein the revised current commands are selected such that a constant shaft torque output can be obtained throughout the whole rotor periphery and the output torque is generally uniform across each slot span.

6. The method according to claim 1 wherein the composite torque command comprises a stall torque command expressed as a percentage.

7. The method according to claim 1 wherein the revised quadrature-axis current command and the revised direct-axis current command are determined by multiplying a stall torque coefficient by the direct-axis current command and a quadrature-axis current command, wherein the stall torque coefficient is defined by a corresponding detected rotor position.

8. The method according to claim 1 wherein revised quadrature-axis current command and the revised direct-axis current command are determined by multiplying a stall torque coefficient by the direct-axis current command and the quadrature-axis current command stored in one or more multi-dimensional look-up tables or data structures in a data storage device.

9. The method according to claim 1 wherein the preset torque threshold is around eighty to eighty-five percent of peak torque of the motor.

10. The method according to claim 1 wherein the preset torque threshold is approximately eighty percent of a maximum stall torque.

11. The method according to claim 1 wherein the preset speed threshold is around 50 revolutions per minute to around 100 rpm.

12. The method according to claim 1 wherein the preset speed threshold is less than or equal to approximately one-hundred revolutions per minute.

13. A system for controlling an electric motor at or near stall operational conditions, the system comprising:
   a sensor for detecting a rotational position of a rotor of the electric motor;
   a data processor for determining whether a composite torque command is larger than a preset torque threshold for a time interval, the composite torque command convertible into a direct-axis current command and a quadrature-axis current command, the data processor adapted to determine whether a sensed motor speed of the rotor is less than a preset speed threshold for the time interval at any lower speed of the rotor that approaches stall operational conditions; and
   a current adjustment module for adjusting the direct-axis current command and the quadrature-axis current command to obtain a revised direct-axis current command and revised quadrature-axis current command for the time interval if the composite torque command is larger than the preset torque threshold and if the motor speed is less than the preset speed threshold, where the revised current commands vary by the detected rotational position of the rotor to achieve a generally constant shaft torque output.

14. The system according to claim 13 further comprising:
   a data storage device capable of communicating with the data processor via a data bus;
   a first look-up table and a second look-up table for generating the direct-axis current command and the quadrature-axis current command, respectively, based on the composite torque command, the first and second look-up tables being stored in the data storage device.

15. The system according to claim 13 wherein the current adjustment module is configured to apply the revised current commands to the motor to minimize or reduce torque oscillation, where the motor comprises a permanent magnet motor with stator slots in a stator and permanent magnets associated with the rotor.

16. The system according to claim 15 wherein the current adjustment module is adapted to select revised current commands such that a constant shaft torque output can be obtained at every rotor position across each slot span, where in the absence of the revised current commands, a maximum peak stall torque would occur approximately at a radial midpoint of each slot of a stator of the motor and a minimum peak stall torque would occur approximately at a radial midpoint of each slot opening of a stator of the motor.

17. The system according to claim 16 wherein the current adjustment module is adapted to select revised current commands such that a constant shaft torque output can be obtained throughout the whole rotor periphery and the output torque is generally uniform across each slot span.

18. The system according to claim 13 wherein the composite torque command is expressed as a percentage of a reference torque.

19. The system according to claim 13 wherein the data processor determines the revised quadrature-axis current command and the revised direct-axis current command by multiplying a stall torque coefficient by the direct-axis current command and a quadrature-axis current command, wherein the stall torque coefficient is defined by a corresponding detected rotor position.

20. The system according to claim 13 wherein the data processor determines the revised quadrature-axis current command and the revised direct-axis current command by multiplying a stall torque coefficient by the direct-axis current command and the quadrature-axis current command stored in data structures in a data storage device.

* * * * *